2,797,172
METHOD OF FORMING PATTERNS OF LUMINESCENT MATERIALS FOR COLOR KINESCOPES

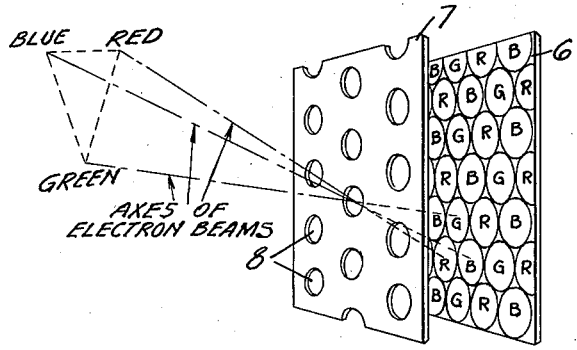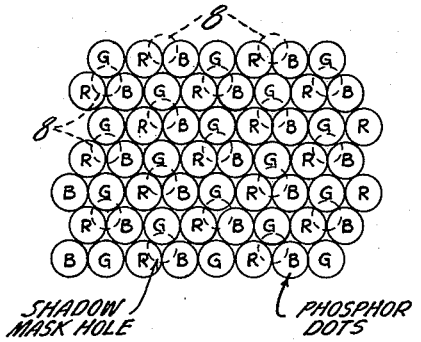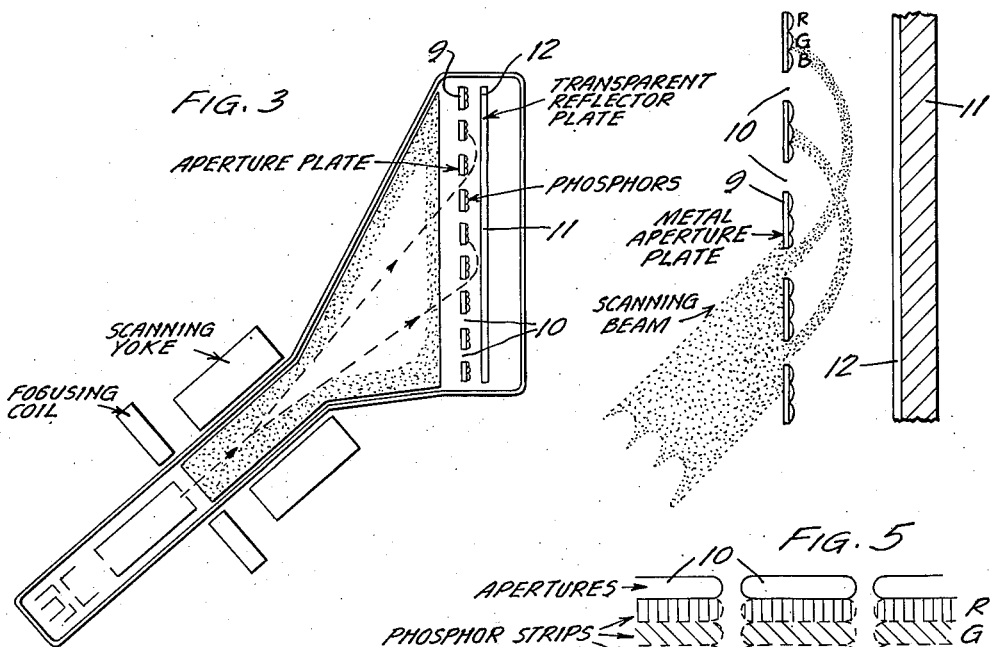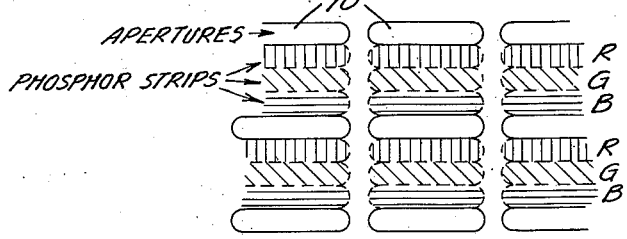
INVENTOR
NORMAN B. MEARS
BY
ATTORNEY

Norman Beebe Mears, West St. Paul, Minn.

Application November 6, 1952, Serial No. 319,077

4 Claims. (Cl. 117—13)

This invention relates to the manufacture of color kinescopes adapted for use in television reproduction tubes and particularly to an improved method of forming patterns of luminescent materials on the face plate or electron-beam side of the viewing screens of such tubes.

Some of the known systems for reproducing colors employ cathode ray beams and luminescent screens which emit characteristic colors when excited by the beam or beams. In such systems a suitable pattern of one of the luminescent materials must be precisely located on the face plate or viewing screen and accurately intermeshed with one or more patterns composed of luminescent materials adapted to emit, when excited, one or more different colors. The best known luminescent materials are the phosphors which are available in compositions which emit red, blue and green colors respectively when excited by cathode rays. The characteristic colors of such materials are not apparent except when exposed to the electron-beams but for convenience such materials are referred to hereinafter by their color designations.

Suitable geometric patterns for coatings of such materials on both translucent and opaque plates have also been developed heretofore. The pattern may be composed of a multiplicity of closely spaced or adjoining dots or lines formed from phosphor coatings of the several colors, similar patterns being defined by phosphor coatings of each of the selected different colors. Such patterns may be intermeshed or nested one with another but should not be overlapped.

It is an object of the present invention to provide a method for forming such patterns of luminescent materials on screens or aperture plates in the form of a thin, uniform film, layer or coating of particles of the required density and continuity wherein substantially all such particles are exposed to the electron beam or beams at the surface of the screen or plate.

A further object is to provide a process or method of the class described which greatly facilitates the accurate location of the several color groups of luminescent particles in accordance with a predetermined intermeshing pattern or design whereby both overlapping and undesirable spacing of the several color groups, and consequent dilution of the picture colors and loss of brightness, is minimized or substantially eliminated.

Other objects will appear and be more fully pointed out in the following specification and claims.

I am aware that phosphor particles have been deposited heretofore in geometric patterns for the purpose described by techniques and procedure wherein a modification of the common silk screen stencil process of printing has been employed. According to this modified stencil process, the phosphor particles are suspended in a suitable lacquer vehicle and the resulting composite "paint" is applied to the viewing screens through a stencil which is used, after cleaning, to apply the several color group patterns. The lacquer vehicle is subsequently broken down and substantially dissipated by heat treatment which leaves the phosphor particles in a loose or substantially free state. These loose particles in place on the work are finally bonded to the work by spraying on a coat of another suitable adhesive which will not detrimentally affect the operation of the color kinescope. It has been found that this prior method of forming the luminescent pattern is not entirely satisfactory because some color dilution in the pictures results from the overlying coat of adhesive on the phosphor particles, mixing of the several color phosphors which are difficult to remove entirely from the stencils after each use and inaccuracies in the location of the several color group patterns caused by expansion of the stencils during the application of the liquid printing medium (containing the phosphor particles) to the stencils. These difficulties are largely overcome by my improved process which is relatively easy to carry out with precise and uniformly good results including the formation of even surface layers of phosphor particles on the underlying adhesive.

According to my improved method the blank plate which is to receive the luminescent material is thoroughly cleansed and is then fastened on the feed or paper end of a printing press in correct register. Using a translucent, varnish-like adhesive as the printing medium a predetermined pattern is printed on the blank plate, leaving other areas of its face exposed. While the pattern defined by the adhesive material on the blank is still tacky, dry phosphor particles of one of the required colors are dusted on the tacky surface so that there is retained on each coated elemental area of the plate, after the loose excess particles have been removed, a substantially continuous, exposed surface layer of the phosphor particles. As the next step, the adhesive material is thoroughly dried on the plate, thus bonding the luminescent material in place precisely over the entire area of the pattern.

In order to hasten the drying operation and insure adequate adhesion of the particles, it may be desirable to heat the work to a temperature and for a period of time which is dependent upon the particular adhesive employed. For example, with my preferred adhesive hereinafter described, the drying treatment is continued for twenty minutes at a temperature of approximately 325° F. The registry of the partially coated work on the press is then readjusted or the work is put back on the press in a suitably readjusted position if it has been removed therefrom for the dusting and drying steps. Then, with the register changed as required for the particular pattern to be formed, a second impression is made on the work by operation of the press using the translucent adhesive as the printing medium. Thereupon, with the second adhesive impression still tacky, dry phosphor particles of a second color are dusted on the tacky areas which are then dried to cause the second deposit of phosphor particles to adhere to the area of the second adhesive impression. Where a third color is required, the hereinbefore-described printing, coating with phosphor particles of another color and drying operations are repeated after again changing the register of the work plate in the press so that the third color pattern of phosphor particles is deposited on a previously exposed area of the plate.

A press of the offset type is essential for performing the printing operations of my improved method because the rubber blanket of the impression cylinders of such presses are adapted to compensate for irregularities in the hard non-absorbent surfaces of the viewing screens or plates upon which the luminescent patterns are to be formed.

Another important factor in the success of my improved method is the discovery of an adhesive which does not detrimentally affect the color picture and is adapted to securely bond the phosphor particles to plates having non-absorbent surfaces, such as the metal masks and glass plates of the viewing screens. Excellent results have been obtained by using for this purpose a non-oxidizing translucent modified alkyd resin, e. g., a phthalic anhydride alkyd made by the union of this anhydride, refined linseed oil and a suitable modifying agent. As an alternative, the alkyd resin may comprise 40% phthalic anhydride and 60% refined linseed oil reacted at a temperature between 400° and 450° F. The resin has a pale amber color and viscosity $Z_9$–$Z_{10}$ at 77° F., Gardner Holt scale. When dried by baking, as described, it forms a secure bond between the phosphor particles and supporting plate. This resin is further and advantageously characterized by properties which make it usable in place of lithographic inks in offset printing presses of common type. As hereinbefore indicated, each printed impression defining a geometric pattern is thoroughly dried, after a layer of phosphor particles has been applied to its tacky surface, by baking in a suitable oven for 20 minutes at a temperature of approximately 325° F. It will be evident to those skilled in the art that other suitable resins may be substituted for the phthalic anhydride alkyd described.

By the foregoing method I form an even layer of particles substantially all of which extend to the surface of the adhesive which is to be exposed to the cathode rays. The detrimental effects caused by the mixing of colors in previously known methods are eliminated by my printing and dusting procedure wherein the phosphor particles of the several colors are applied successively to distinct precisely located tacky areas of the adhesive followed by removal of all loose particles and thorough drying of the adhesive on areas previously coated with color particles.

Suitable patterns for the luminescent materials of the plates of tri-color kinescopes are illustrated in the accompanying drawing, but it will be understood that my improved method is adapted to the formation of many other patterns of luminescent materials as well as those illustrated.

Referring to the accompanying drawing:

Figure 1 is a diagrammatic perspective view showing a phosphor screen for one type of tri-color kinescope in relation to the electron beams and shadow mask;

Fig. 2 is a front elevational view showing the relationship between the phosphor dot pattern and shadow mask holes of the kinescope of Fig. 1;

Fig. 3 is a diagrammatic sectional view of a reflection type, three-color kinescope;

Fig. 4 is a fragmentary diagrammatic view on a larger scale showing the reflection type aperture plate and reflector plate of the type shown in Fig. 3, and Fig. 5 is a front elevational view, greatly enlarged, showing a portion of the aperture plate carrying the strip pattern of color phosphors.

Referring to Fig. 1, the numeral 6 indicates a flat glass plate which is covered with phosphor dots arranged in an interlocking pattern wherein each dot is approximately tangentially disposed to the periphery of the adjacent dots and the several groups of blue, green and red dots are indicated by the letters B, G and R, respectively. This dot pattern or array is adapted for use with a shadow mask 7 having apertures 8 through which electron beams are directed to the phosphor dots. Three electron beams are used, one for each primary color, the system being designated as a three gun shadow-mask color kinescope. The mask 7 may comprise a thin metal sheet and the apertures therein are so arranged that the electron beam which is to contribute the red part of the picture is prevented by the mask from striking those areas of the screen which are coated with blue and green-emitting phosphors. In a similar manner the green and blue cathode beams are so shielded as to reach only the green and blue-emitting phosphor dots respectively.

Fig. 2 illustrates the geometrical arrangement of the apertures in the mask 7 relative to the phosphor dots on the plate 6 in the region near the axis of the tube.

For the reflection-type color kinescope shown diagrammatically in Figs. 3, 4 and 5, rows of red, green and blue phosphor strips, indicated respectively by the letters R, G and B are carried by an aperture plate 9 which is formed with rows of elongated apertures 10 through which the electron-beams are directed at approximately a 45° angle to the plate. At the front of the plate 9 a glass plate 11 is positioned and carries a transparent conducting coating 12 which is energized to reflect the electron beams against the phosphor coated surface of the plate 9. An electric field between the aperture plate 9 and reflector coating 12 causes the transmitted portions of the beams to be reflected and to return in a parabolic path to the aperture plate where each beam strikes one of the phosphor strips. The color picture is viewed directly through the plate 11 and reflector coating 12.

Groups of color phosphors may be deposited on the plate 11 by my improved method in the form of strips so arranged that a group of three strips emitting red, green and blue light respectively is laid between each pair of apertures 10. The width of each of the phosphor strips within the group is approximately the same as that of the apertures so that the reflected beams can be made to fall on any one of the three colors selectively.

Various other types of luminescent patterns may be formed on either translucent or opaque plates without departing from the spirit of my invention.

Having described my invention, what I claim as new and desire to protect by Letters Patent is:

1. In the art of forming on a hard surface of a color kinescope plate a plurality of patterns of color-emitting phosphor particles having respectively different color-emitting characteristics, each pattern consisting of a plurality of spaced, minute elemental areas intermeshed with distinct spaced, minute elemental areas of the other pattern or patterns and wherein substantially all of the phosphor particles are exposed at the surface of the plate; the improved process which comprises, depositing by an offset printing procedure a suitable adhesive material on the elemental areas of the plate surface which are to receive a first pattern, said procedure including the steps of depositing adhesive material defining said pattern on a resilient compressible blanket and transferring the pattern to the hard surface of the plate by pressing the blanket carrying said pattern on the plate, leaving the elemental areas of said surface which are to receive the other pattern or patterns bare, then dusting on to the resulting adhesive coated elemental areas while in a tacky condition a first color-emitting phosphor in the form of dry particles, then removing the non-adhering phosphor particles, drying the adhesive underlying the adhering particles to securely bond them to the plate, then changing the registry between said resilient compressible blanket and the plate, then depositing on the same resilient compressible blanket a second pattern of adhesive material and transferring said pattern from said blanket to bare areas of said plate, then applying to said second transferred pattern of adhesive material phosphors in dry powder form having different color-emitting characteristics and repeating said steps of removing non-adhering particles and drying the adhesive material underlying the second pattern of phosphors.

2. A process in accordance with claim 1 wherein a third pattern of color-emitting phosphors is formed on additional elemental bare areas of said plate by a repetition of said steps of changing the registry between said resilient compressible blanket and the plate, then applying a pattern of suitable adhesive material to the same resilient compressible blanket, transferring the third pattern of adhesive material from said blanket to the plate, dusting on the phosphors, removing non-adhering particles of phosphors, and drying the adhesive material underlying the adhering phosphors of the third pattern.

3. The process in accordance with claim 1 wherein said adhesive material comprises a translucent resin suitable for use as a printing medium in offset printing and selected from the group consisting of alkyd resins and modified alkyd resins.

4. The process in accordance with claim 2 wherein said adhesive material comprises a translucent resin suitable for use as a printing medium in offset printing and selected from the group consisting of alkyd resins and modified alkyd resins.

References Cited in the file of this patent

UNITED STATES PATENTS

| | | |
|---|---|---|
| 59,959 | Burgess | Nov. 27, 1866 |
| 1,471,895 | Huebner | Oct. 23, 1923 |
| 1,888,849 | Dawson | Nov. 22, 1932 |
| 1,897,148 | Rowell | Feb. 14, 1933 |
| 2,113,090 | McKeag et al. | Apr. 5, 1938 |
| 2,310,863 | Leverenz | Feb. 9, 1943 |
| 2,625,734 | Law | Jan. 20, 1953 |

FOREIGN PATENTS

| | | |
|---|---|---|
| 14,508 | Great Britain | of 1889 |

OTHER REFERENCES

Ellis: The Chemistry of Synthetic Resins, 1935, volume II, pp. 918, 925, 926 and 927.

Printed Circuit Techniques, N. B. S. Circular 468, pp. 12 and 13.

Mansell: "Vehicles for Luminous Pigments," Organic Finishing, June 1948, pp. 33 to 40.

Hackleman: Commercial Engraving and Printing, 1921, pp. 503, 504, 506, 510, 512.